United States Patent [19]
Lueder et al.

[11] Patent Number: 6,154,146
[45] Date of Patent: Nov. 28, 2000

[54] METHOD OF RENDERING MISUSE OF COMMUNICATION SERVICES MORE DIFFICULT

[75] Inventors: Reinhard Lueder, Holzkirchen; Renate Zygan-Maus, München, both of Germany

[73] Assignee: Siemens Aktiengesellschaft, Munich, Germany

[21] Appl. No.: 09/051,942

[22] PCT Filed: Oct. 31, 1996

[86] PCT No.: PCT/EP96/04757

§ 371 Date: Apr. 23, 1998

§ 102(e) Date: Apr. 23, 1998

[87] PCT Pub. No.: WO97/16914

PCT Pub. Date: May 9, 1997

[30] Foreign Application Priority Data

Nov. 2, 1995 [EP] European Pat. Off. .............. 95117273

[51] Int. Cl.[7] ...................................................... G07D 7/00
[52] U.S. Cl. ........................................ 340/825.34; 713/200
[58] Field of Search ........................... 340/825.44, 825.3, 340/825.06, 825.34; 705/44; 379/189; 455/410; 380/23; 178/22.08; 713/200, 201

[56] References Cited

U.S. PATENT DOCUMENTS

| 4,326,098 | 4/1982 | Bouricius et al. ................... 178/22.08 |
| 4,799,255 | 1/1989 | Billinger et al. ......................... 379/189 |
| 5,343,529 | 8/1994 | Goldfine et al. .......................... 380/23 |
| 5,978,669 | 11/1999 | Sanmugam ............................. 455/410 |

*Primary Examiner*—Michael Horabik
*Assistant Examiner*—M Shimizu
*Attorney, Agent, or Firm*—Hill & Simpson

[57] ABSTRACT

In many communication service, such as for example virtual card calling (VCC), authentication methods are used to check the access authorization of the caller to the communication service, and thus to prevent possible misuse. A chance-controlled fee assessment is used to prevent possible misuse of the communication service.

2 Claims, 1 Drawing Sheet

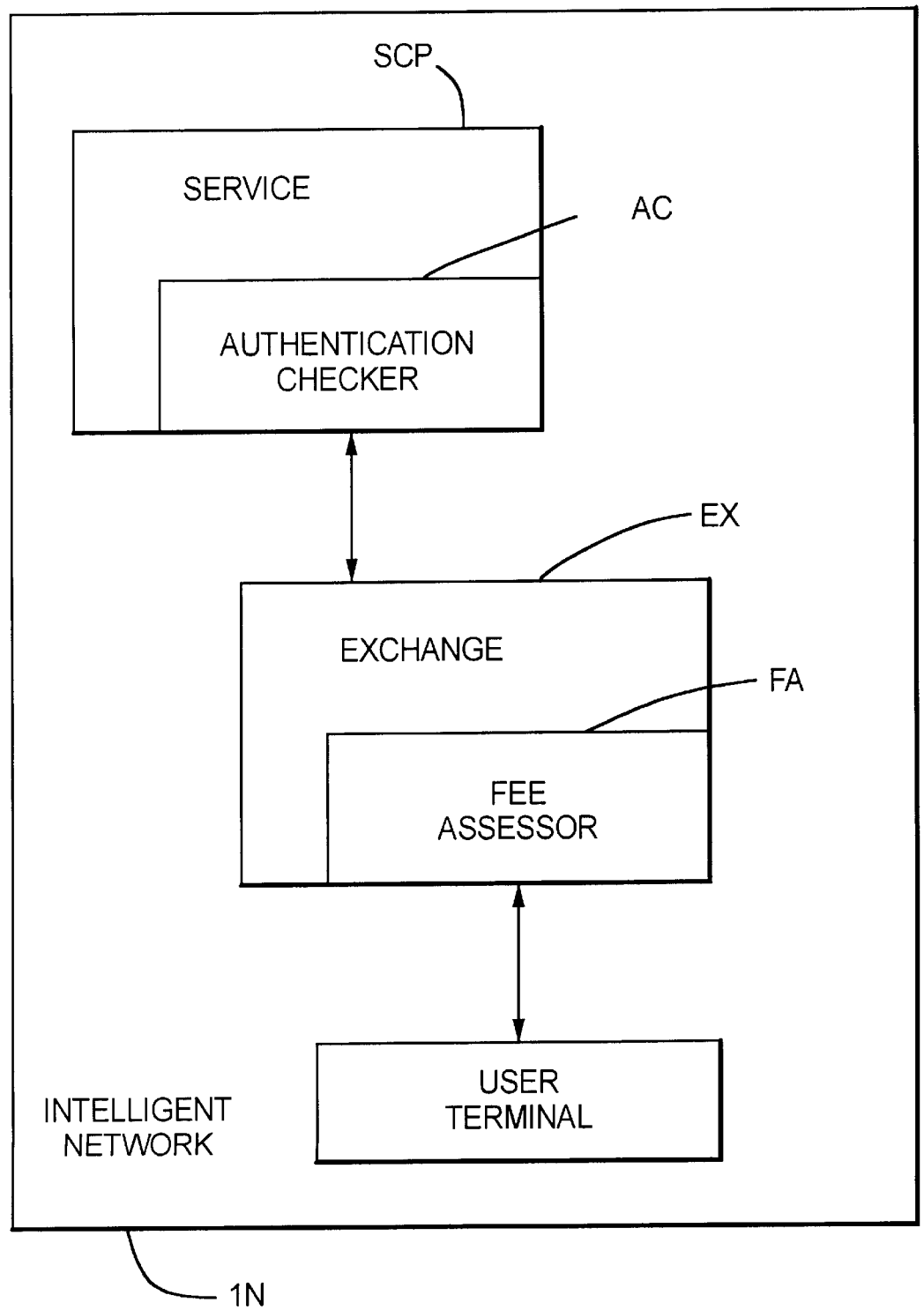

METHOD OF RENDERING MISUSE OF COMMUNICATION SERVICES MORE DIFFICULT

BACKGROUND OF THE INVENTION

For many communication services, realized for example with the aid of a intelligent network (IN), such as for example Virtual Card Calling (VCC), Universal Personal Telecommunication (UPT), remote access to Virtual Private Network (VPN) and multimedia services, authentication methods are used to check the caller's access authorization to the communication service and to allocate the fees to him.

Such authentication methods are usually based on the input of a user identification (e.g., a card number) and, if warranted, a personal identification number (PIN) as well. The user must keep these authentication data secret.

The foregoing authentication methods can offer only limited security. This is because valid authentication data can in principle be determined by trying out a large number of data, and can then be used abusively, e.g. in order to carry out communications at the expense of someone else.

If this misuse (illegal use) is to be impeded by the use of numbers with a larger number of digits, acceptance problems arise, since very long inputs are then necessary in normal use (legal use).

An impedance of misuse can also be effected in principle by charging fees for unsuccessful authentication processes. However, this charging of fees cannot take place to the account of the user, as actually desired, because at the time of unsuccessful authentication processes the user has not yet been identified. In place of this, a charge to the account of the terminal used is on the other hand undesirable for the legal use of these services, because it contradicts the fee principle of these services. This is because according to this fee principle, the terminal used should remain free of fees, because the terminal used in these services may belong to a third party.

The result of the above is that, under the control at a PC, thousands of authentication attempts can be carried out abusively (with a chance of success) without any fees thereby arising for the abusive caller (illegal user). The misuse can thus be practiced commercially.

Due to the circumstance that unsuccessful authentication processes are free of charge, a further case of misuse is also made easier. For reasons of security, access to a service is as a standard procedure blocked for a user if, given his identification, a predetermined number of false PIN entries is exceeded. Persons with malicious intent can make use of this to block access to services for others deliberately and without incurring fees.

SUMMARY OF THE INVENTION

The invention is based on the object of impeding the named misuse, without thereby having any significant adverse effect on the legal use of the services named.

In general terms the present invention is a method for impeding misuse in communication services, in which user-specific authentication data must be inputted in order to call a communication service. The authentication of the service user is carried out by the communication network. A chance-controlled fee assessment is caused for the network terminal used to call the communication service, before the service user can determine that there has been an unsuccessful authentication.

The present invention is also an authentication means of a network, which, given a call to a communication service by a user, carries out an authentication by checking the authentication data indicated by the user. Given successful authentication, the user gains access to the communication service. The authentication causes a chance-controlled fee assessment for the network terminal used to carry out the call, before the service user can determine that there has been an unsuccessful authentication.

By means of the invention, the following is achieved:

In case of input errors, the normal user can expect that there is only a relatively low probability (e.g. 1:20 chance) that the terminal he is using will be charging a fee.

In contrast, in the case of misuse there necessarily occurs a high number of failed attempts while the possibilities are being sequentially tried. If, due to the statistical degree of security, an average of e.g. 10,000 failed attempts are necessary in order to find a successful authentication by chance, and a probability of a charge of for example one in twenty is predetermined, then on average 500 attempts will be paid. The misuse can thereby become economically not worthwhile, especially if relatively low credit limits are established for the accounts that are determined to be subject to abuse. At higher credit limits, either the statistical degree of security can be increased, or the probability of a charge can be increased.

BRIEF DESCRIPTION OF THE DRAWING

The features of the present invention which are believed to be novel, are set forth with particularity in the appended claims. The invention, together with further objects and advantages, may best be understood by reference to the following description, in which:

The single FIGURE depicts an embodiment of the present invention and use of the method of the present invention.

DESCRIPTION OF THE PREFERRED EMBODIMENTS

In the following, an exemplary embodiment of the invention is explained in more detail on the basis of the procedure that takes place in a call (see the single FIGURE).

A call to one of the services mentioned above is first begun free of fees. If the service controlling SCP in an intelligent network IN recognizes an unsuccessful authentication attempt, (authentication checker AC) it determines in a manner controlled by chance whether a charge should take place for the terminal used by the caller.

If the chance controlling yields a positive result, it gives a fee order to the charging, e.g. an exchange EX in the network IN. The charge thereby becomes effective before the caller learns the result of the authentication check. A particular probability is predetermined for the chance controlling, for example, a 1:20 chance.

The following is thereby achieved:

In case of input errors, the normal user can expect that there is only a relatively low probability (e.g. 1:20) that the terminal he is using will be charged a fee.

In contrast, in the case of misuse there necessarily occurs a high number of failed attempts while the possibilities are being sequentially tried. If, due to the statistical degree of security, an average of e.g. 10,000 failed attempts are necessary in order to find a successful authentication by chance, and a probability of fee charge of e.g. 1:20 is predetermined, then on average 500 attempts will be paid. The misuse can thereby become economically not worthwhile, especially if relatively low credit limits are established for the abusively determined accounts. At higher credit limits, either the statistical degree of security can be increased, or the probability of a charge can be increased.

The probability to be predetermined for the chance controlling can be adapted on the one hand to the existing statistical degree of security and on the other hand to the expected user acceptance for the changes for of failed attempts.

This relatively simple method for impeding misuse by means of chance-controlled charges of unsuccessful authentication attempts is in itself particularly suitable when the existing statistical degree of security is relatively high, due to a larger number of digits for user identification and/or PIN, so that in the case of misuse a very large number of authentication attempts is required.

In the following, a further method for impeding misuse is explained in more detail, offering specific advantages (to be explained later) in connection with the previous method.

For the realization of this further method, the charging means FA, which is for example realized in an exchange EX in the network IN, is equipped so that it can carry out a provisional charge that can be canceled. This special charge becomes effective when a call is terminated, before a cancellation of the charge has taken place.

The sequence of the method is as follows:

If, given a call to a relevant service, the service controlling SCP has recognized a complete but unsuccessful authentication, then it assigns the activation of the provisional, cancellable charge to the exchange EX to which the terminal TR of the call is allocated. (The activation can in principle also take place immediately at the beginning of the call. However, this is less favorable with respect to acceptance, because then premature interruptions become subject to fees.)

The activation is thereupon carried out by the exchange EX to which it has been assigned, before the caller learns the result of the authentication test. (In this way, it is ensured that the misuser cannot carry out any single attempts without incurring a fee.)

If the service controlling subsequently recognizes a successful authentication, it gives the order for the cancellation of the charge, and the overall authentication process remains free of charge.

However, if a call is terminated after an unsuccessful authentication, without a subsequent successful authentication leading to a cancellation of the provisional fee assessment, a fee is charged for the call.

The permissible number of unsuccessful authentications within a call is limited, e.g. to three. If this is exceeded, the call is charged a fee in any case. In a possible embodiment, the call is then also cleared down.

The following is thereby achieved:

a) For the normal user (legal user), or, more precisely, for the terminal via which the user is calling the service, further unsuccessful authentication processes caused by input errors also remain free of charge up to a certain number, if, within the same call, a successful authentication does finally take place.

b) In contrast, in case of misuse the attempted abusive use becomes subject to fee, due to the large number of unsuccessful authentication attempts. The misuse thereby becomes economically unworthwhile.

The method explained can of course also be constructed in such a way that the cancellable charge is calculated according to the number of unsuccessful authentication processes, rather than by time units.

If the cancellable fee assessment takes place according to time units and the number of attempts, a further construction can be that a cancellable charge according to time units takes place already at the beginning of the call, in contrast to which the cancellable charge according to the number of attempts is not activated until after a determined number of unsuccessful authentication processes.

If both methods, i.e. the chance-controlled charge and the cancellable charge, are combined, the probability of charge in case of input errors is reduced still further for the normal user. The user can then reckon with a chance probability of charge of only e.g. 1:20 in case of input error, if he does not succeed in carrying out a subsequent successful authentication within the same call.

Unfortunately, in the case of misuse failed attempts are then also charged a fee only with the same chance probability. However, this is sufficient if the existing statistical degree of security is relatively high due to a greater number of digits for user identification and/or PIN, so that in the case of misuse a very large number of authentication attempts is necessary.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for impeding misuse in communication services, in a communication network, comprising the steps of:

inputting at a network terminal user-specific authentication data for calling a communication service;

authenticating the data using the communication network;

effecting a chance-controlled charge for the network terminal used to call the communication service, before a service user at the network terminal can determine that there has been an unsuccessful authentication.

2. A service controlling system in a network, comprising:

the network having at least a communication service, a network terminal and an exchange;

user-specific authentication data that is submitted by a user at the network terminal in association with a call to the service and that is communicated to the service controlling system of the called service via the exchange;

the service having an authentication checker for checking the data and the exchange having a fee assessor for charging a fee to the user;

given a call to the communication service by the user, authentication is carried out by checking the authentication data indicated by the user and, given successful authentication, the user is given access to the communication service;

the service controlling system invoking a charge according to a predetermined probability for the network terminal used to carry out the call, before the user can determine that there has been an unsuccessful authentication.

* * * * *